United States Patent [19]

Serras-Paulet

[11] Patent Number: 4,807,102
[45] Date of Patent: Feb. 21, 1989

[54] ALTERNATING CURRENT ELECTRICAL POWER SUPPLY CIRCUIT

[76] Inventor: Edouard Serras-Paulet, 38bis Boulevard d'Argenson, 92200 Neuilly sur Seine, France

[21] Appl. No.: 10,852

[22] Filed: Feb. 4, 1987

[30] Foreign Application Priority Data

Feb. 6, 1986 [FR] France ............................. 86 01623
Apr. 15, 1986 [FR] France ............................. 86 05345

[51] Int. Cl.$^4$ ........................................... H02M 5/453
[52] U.S. Cl. ......................................... 363/37; 307/64
[58] Field of Search .................................... 363/34–37, 363/46, 20, 21; 307/64–66

[56] References Cited

U.S. PATENT DOCUMENTS

| 4,073,003 | 2/1978 | Chambers | 363/20 |
| 4,313,060 | 1/1982 | Fickenscher et al. | 363/37 X |
| 4,506,766 | 3/1985 | Watanbe | 363/37 X |
| 4,613,795 | 9/1986 | Itani et al. | 363/37 X |
| 4,620,272 | 10/1986 | Fulton et al. | 363/37 X |
| 4,642,475 | 2/1987 | Fischer et al. | 363/37 X |

FOREIGN PATENT DOCUMENTS 8501157  3/1985  European Pat. Off. .
0169756  1/1986  European Pat. Off. .

OTHER PUBLICATIONS

Electronics and Communications in Japan, part II: Electronics, vol. 69, No. 6, 1986, pp. 63–70, New York, US; T. Koyashiki et al.
"A Multiinput Type Converter for an Uninterruptible DC Power Supply" * p. 66, right column, paragraph 4, Figure 5*.
M. Pierre, "L'alimentation Électrique des Ordinateures" Revue Generale de L'electricite, vol. 81, No. 9, Sep. 1972, pp. 558–561, Paris, FR.

Primary Examiner—Patrick R. Salce
Assistant Examiner—Emanuel Todd Voeltz
Attorney, Agent, or Firm—Charles E. Brown; Charles A. Brown

[57] ABSTRACT

An alternating current electrical power supply circuit comprises a rectifier adapted to be connected to an AC mains supply. It produces a rectified output voltage including ripple. An amplifier-inverter has power supply terminals connected to the output of the rectifier. A voltage including ripple synchronous and in phase with the voltage of the AC mains supply is applied to a control input of the amplifier-inverter.

21 Claims, 3 Drawing Sheets

ALTERNATING CURRENT ELECTRICAL POWER SUPPLY CIRCUIT

BACKGROUND OF THE INVENTION

1. Field of the invention

The invention concerns an alternating current (AC) electrical power supply circuit principally intended to supply power to data processing equipment and/or systems for acquiring and processing low-level signals, specifically requiring a power supply that does not produce any radiated or conducted interference.

The invention is more particularly directed to a circuit that can be used to provide a power supply of high efficiency and that is stabilized and/or protected to withstand at least short-term interruptions of the AC mains supply.

2. Description of the prior art

It is often necessary to connect an AC electrical power supply device between the AC mains supply and systems including data processing equipment and/or systems for acquiring and processing low-level measurement signals to prevent the operation of such systems being disturbed by the imperfections of the AC mains supply, in particular voltage fluctuations and/or short-term or long-term interruptions. The following capabilities are required of equipment of this kind:

It should not produce any radiated or conducted interference (switching noise) likely to induce in sensors or their connections voltages which will corrupt the low-level signals to be measured and/or processed.

It should be able, as and when required, to stabilize the AC voltage supplied to a certain degree to protect sensitive equipment from fluctuations on the AC mains supply voltage, which are typically ±10% relative to the nominal voltage.

It should be able to withstand failure of the AC mains supply, specifically at least short-term (up to 50 ms) interruptions at relatively frequent intervals and, wherever possible, long-term interruptions that are much rarer but can last several minutes or even several hours.

It should where necessary provide galvanic isolation between the AC mains supply and the user circuit.

It should preferably have the highest possible efficiency.

Known systems rarely combine all these qualities.

There are known, for example, devices using "ferro-resonant" type transformers. These procure somewhat mediocre voltage stabilization (typically ±5% at the output for a variation of ±10% at the input). The energy store guarding against short-term interruptions is provided by a resonant circuit formed by an inductor coupled to the magnetic circuit and a capacitor. Such systems have major defects, for example poor dynamic response to sudden increases in load and major variation in the output voltage due to variations in the AC mains supply frequency. For this reason they cannot usually be employed on AC mains supplies using different frequencies. They are heavy, bulky and obsolete. They also entail the risk of radio frequency interference due to the saturation current of the magnetic component. Finally, and most importantly, they cannot withstand long-term failure of the AC mains supply, necessitating the use of an electrochemical accumulator.

Where a significantly long back-up time is required use is often made of an inverter fed by a rectifier and an electrochemical accumulator of appropriate capacity connected in parallel between the rectifier and the power supply terminals of the inverter. The inverter thus operates from a direct current (DC) voltage filtered by the accumulator itself. The inverter has to produce a sinusoidal voltage from a DC voltage and is often of the pulse width modulation type, using transistors or thyristors, and operating at high frequencies, with the result that its use can be problematical at extreme temperatures. Switching of the semi-conductor devices that inverters comprise often produces electrical interference that makes it difficult to use them in the vicinity of sensitive measuring instruments.

To improve efficiency and to reduce overall size it has also been proposed to use a switching mode inverter with a transformerless connection to the high-voltage supply connected on the input side to a switching mode rectifier connected to the AC mains supply and supplying a high DC voltage and to a DC-DC converter supplied by an electrochemical accumulator which is substituted for the AC mains supply when the latter fails. The converter is to some extent connected in parallel with the output of the rectifier, the accumulator being connected to a charger that needs only to be rated highly enough for recharging it. A system of this kind is not particularly reliable because of the large number of switching mode circuits used. A high level of electrical interference is produced and is difficult to control. This method is difficult to employ when high powers are involved.

Another known approach is to use the AC mains supply normally and to switch over to a standby supply as quickly as possible should it fail. This switching may be effected by solid-state contactors (thyristors) that switch to the load an inverter operating into no load when the AC mains supply is present. The inverter is supplied with power by a battery connected permanently to a charger. With a system of this kind efficiency is high when operating from the AC mains supply and the inverter may be a compact unit since it is used only while the AC mains supply is down. However, interference is inevitably produced when the solid-state contactors change state. There is- usually no isolation from the AC mains supply and it is not possible to stabilize the load voltage. Some of these disadvantages may be circumvented by combining a ferro-resonant inverter with a system of this kind but in this case all the disadvantages previously mentioned apply, for example variation in the output voltage with the frequency and/or the load and poor dynamic response.

The invention combines most of the advantages of the various known systems described above while avoiding their major disadvantages. A first object of the invention is to propose an alternating current electrical power supply circuit combining excellent efficiency with a low level of electrical interference (radiated or conducted) lending itself to effective regulation of the output voltage and/or to the addition of an auxiliary power supply that can be substituted for the AC mains supply should this fail.

SUMMARY OF THE INVENTION

The present invention consists in an alternating current electrical power supply circuit comprising a rectifier adapted to be connected to an AC mains supply and to produce a rectified output voltage including ripple, an amplifier-inverter having power supply terminals connected to the output of said rectifier and a control input, and means for generating a voltage including ripple synchronous and in phase with the voltage of said AC mains supply connected to said control input of said amplifier-inverter.

The term "amplifier-inverter" is to be understood as meaning a specific type of inverter comprising an amplifier stage operating in class B (or possibly in class C, as will be explained hereinafter) the essential function of which is to produce an output voltage including ripple in response to a signal applied to its control input or (in the case of class C operation) to transmit the voltage delivered by the rectifier and means for producing an AC voltage from the waveform delivered by this amplifier stage. Where it is required to regulate the AC output voltage, use will specifically be made of an amplifier stage operating in class B the function of which is to deliver at its output a voltage including ripple formed by a succession of "sinusoidal arcs" of the same polarity. A transformer will then usually serve as the means for producing a sinusoidal AC voltage from these sinusoidal arcs.

With an arrangement of this kind, and according to an important characteristic of the invention, the efficiency is excellent (exceeding 75%) since losses in the amplifier-inverter depend on the voltage difference between the waveform supplied by the rectifier and that (synchronous and in phase with the latter) delivered by the amplifier stage. A simple and conventional regulator loop between the output of the amplifier-inverter and a comparator connected to its input make it possible, where necessary, to regulate the sinusoidal output voltage.

On the other hand, if it is not essential to regulate the output voltage for the application in question, efficiency can be further improved by modifying the amplifier stage so that it operates in class C. In this case both branches of the amplifier will be constrained to operate in switching mode rather than in linear mode so that the class C amplifier stage will transmit the "sinusoidal arcs" directly to the transformer responsible for producing a sinusoidal AC output voltage.

In both the cases envisaged hereinabove the amplifier-inverter could easily be coupled to a standby electrical power supply such as a capacitor, at the least (for short-term interruptions), or an electrochemical accumulator (for long-term interruptions).

In this case, the alternating current electrical power supply circuit in accordance with the invention preferably further comprises an auxiliary amplifier having a control input connected to means for generating a voltage including ripple synchronous and in phase with the voltage of the AC mains supply, energy storage means to which the auxiliary amplifier is connected, and means whereby the auxiliary amplifier has its output connected to the power supply terminals of the amplifier-inverter.

The invention will be better understood and other advantages of the invention will emerge more clearly from the following description of a number of embodiments of an alternating current electrical power supply circuit in accordance with the invention, given by way of example only and with reference to the appended drawings.

DESCRIPTION OF THE PREFERRED EMBODIMENTS

Figure 1:
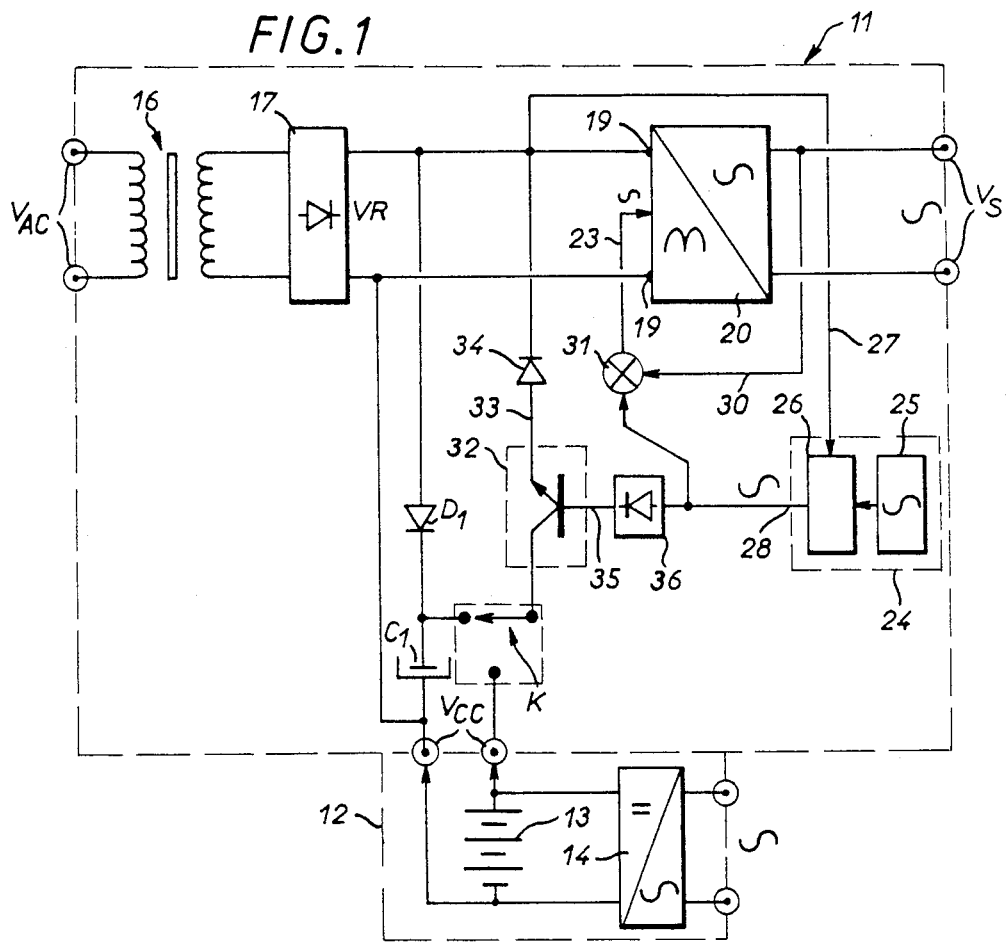
FIG. 1 is block diagram of one embodiment of an alternating current electrical power supply circuit in accordance with the invention.

Referring to FIG. 1 in particular, there is shown an electrical power supply circuit 11 protected against short-term interruptions of an AC mains supply connected to its input terminals $V_{AC}$. The circuit is optionally associated with a DC voltage supply 12 that can be connected to its input terminals $V_{CC}$ to increase the time for which it provides protection. The direct current voltage supply 12 consists of an electrochemical accumulator 13 the terminals of which are connected to the terminals $V_{CC}$ and a charger 14 the output of which is connected to the accumulator. The charger is supplied with power by the AC mains supply and its rating merely has to be large enough to charge the accumulator.

Figure 2:
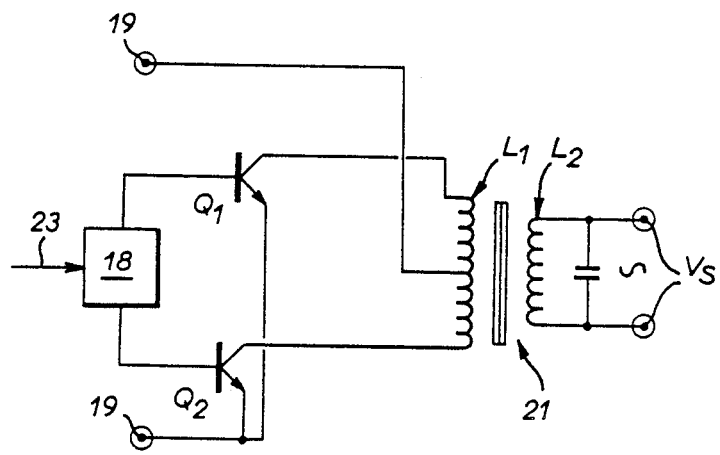
FIG. 2 is a diagram showing part of one embodiment of the amplifier-inverter from FIG. 1.

The power supply circuit 11 comprises a voltage reducing transformer 16 the primary winding of which is connected to the terminals $V_{AC}$ and the secondary winding of which is connected to a rectifier 17. The output of the latter is connected directly to power supply terminals 19 of an amplifier-inverter 20. The amplifier-inverter 20 has its output connected to output terminals $V_S$ delivering a sinusoidal AC load voltage. It should be noted at this point in the description that, as distinguished from known devices which comprise capacitors (or an electrochemical accumulator) connected in parallel with the output of the rectifier 17 to obtain a DC voltage power supply for the inverter, as rigorously filtered as possible (type $V_{RF}$, see FIG. 4a), the amplifier-inverter 20 is fed directly with "sinusoidal arcs" (type $V_R$, see FIG. 4b). This important characteristic is specific to the invention and is one reason for the high efficiency of the circuit in spite of the use of a linear amplifier stage operating in class B in the amplifier-inverter 20. The latter conforms to the definition given hereinabove. FIG. 2, for example, shows a "push-pull" type power stage comprising two transistors $Q_1$, $Q_2$. The collectors of these transistors are loaded by the primary winding $L_1$ of an output transformer 21. The primary winding $L_1$ comprises a center tap connected to one of the power supply terminals 19. The secondary winding $L_2$ of the transformer 21 is connected to the output terminals $V_S$. A capacitor is connected in parallel with this winding.

A control circuit 18 (FIGS. 2 and 5), the detailed design of which is within the competence of those skilled in this art, has a control input 23 which is also the control input of the amplifier-inverter and is connected to the bases of the transistors $Q_1$, $Q_2$ so that they operate in class B. Thus the class B biased power amplifier stage may be directly controled by an AC voltage including ripple applied to its control input 23. This voltage including ripple is produced by generator means 24 synchronized to the voltage of the AC mains supply. To this end it comprises a master oscillator 25 operating at the same frequency as the AC mains supply and a synchronization circuit 26 connected to the rectifier or to the AC mains supply by a connection 27. The detailed design of such synchronous generator means is within the competence of those skilled in the art. Thus provided that the AC mains supply is operating normally the voltage available at the output 28 of the generator means 24 is sychronous and in phase with that of the AC mains supply. If the AC mains supply voltage should fail, the oscillator 25 continues to operate at the same frequency and, as soon as the AC mains supply voltage reappears, the synchronization circuit 26 functions to eliminate any phase difference between the signal available at the output 28 and the AC mains supply voltage.

The amplifier-inverter 20 comprises or is associated with feedback means here shown symbolically as a feedback loop 30 between the output of the amplifier-inverter and an input of a differential comparator 31. The other input of this comparator is connected to the output 28 and its output is connected to the control input 23 of the amplifier-inverter 20. These conventional feedback means regulate the AC voltage available at the output terminals $V_S$. This voltage is therefore independent of variations in the AC mains supply voltage which result in variations in the amplitude of the "sinusoidal arcs" $V_R$ (FIG. 4b) delivered by the rectifier 17.

To guard against failure of the AC mains supply an auxiliary amplifier 32 (symbolically represented here as a transistor operating in a linear circuit) is connected to be supplied with power by electrical energy storage means consisting of a capacitor $C_1$ and/or the accumulator 13. The output 33 of this auxiliary amplifier is connected to the power supply terminals 19 of the amplifier-inverter 20 by a diode 34. The electrical energy storage means consist in at least the capacitor $C_1$ which has a capacitance sufficient to supply power to the auxiliary amplifier 32 (and consequently the amplifier-inverter 20) during a short-term interruption of the AC mains supply. The capacitor is normally kept charged by a charging circuit connected to the AC mains supply and symbolically represented here as a diode $D_1$ connected between the output of the rectifier 17 and the capacitor $C_1$. A contactor K is connected between the amplifier 32, on the one hand, and the capacitor $C_1$ and (where applicable) the accumulator 13, on the other hand. For one position of the contactor K the amplifier 32 is supplied with power by the capacitor $C_1$ and the sinusoidal voltage available at the output $V_S$ is devoid of the short-term interruptions of the AC mains supply. If the supply 12 is connected to the terminals $V_{CC}$, the contactor K changes state and the installation has a longer back-up time dependent on the capacity of the accumulator 13.

The control input 35 of the auxiliary amplifier 32 (which also operates in class B) receives the signals available at the output 28 through the intermediary of a rectifier 36. Given these conditions, the auxiliary amplifier (which is not of the "push-pull" type in this instance) receives at its input sinusoidal arcs similar to those which are delivered by the rectifier 17, synchronous and in phase with the latter. Such amplified "arcs" are therefore available at the output 33. However, the gain of the auxiliary amplifier 32 is adjusted so that the "arcs" that it delivers are at a slightly lower voltage than the "arcs" delivered by the rectifier 17 when the AC mains supply is supplying a minimum sinusoidal voltage (the nominal voltage—10%, for example). Under these conditions the diode 34 is normally cut off when the AC mains supply is functioning normally and the auxiliary amplifier 32 operates into no load, consuming relatively little power.

Because of the amplifier-inverter is fed directly with "sinusoidal arcs" synchronous and in phase with its control voltage, the losses incurred in it are very low.

Figure 4A:
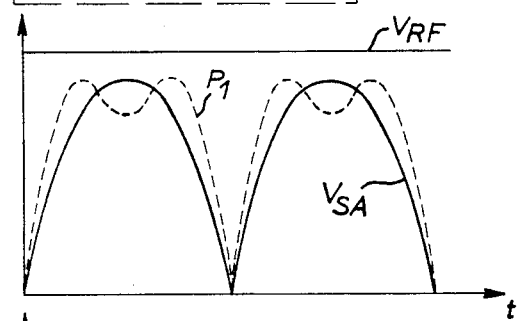
FIGS. 4a and 4b are timing diagrams showing the improvement that can be achieved through using the invention.
Figure 4B:
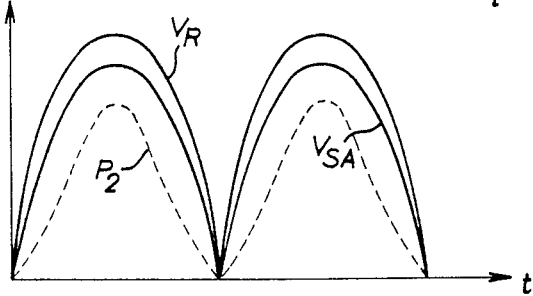

A comparison of FIGS. 4a and 4b shows why the amplifier-inverter 20 operates extremely efficiently. Both timing diagrams show the waveform $V_{SA}$ delivered at the output of the power amplifier stage of the amplifier circuit of the amplifier-inverter. If the supply voltage of the latter were a carefully filtered DC voltage $V_{RF}$ (FIG. 4a) the losses incurred in the amplifier-inverter would depend on the instantaneous difference between voltages $V_{RF}$ and $V_{SA}$. "sinusoidal arcs" $V_R$ (FIG. 4b) synchronous and in phase with $V_{SA}$, the losses are much lower although they are still conditioned by the instantaneous difference between voltages $V_R$ and $V_{SA}$. The dashed curves $P_1$ and $P_2$ on figures 4a and 4b show the respective losses in each case, assuming that the current is sinusoidal and in phase with the voltage.

Given this assumption, losses are reduced by more than 50%. It is important to know that if the current and the voltage are out of phase, as is generally the case, the reduction in losses is even greater. Thus for a phase difference of 45°, the losses are reduced by around 65%.

Operation after failure of the AC mains supply is as follows. If the DC voltage supply 12 is not connected, the contactor K is placed in a position such that the capacitor $C_1$ is in service. Immediately the voltage $V_R$ drops below a predetermined low threshold the diode 34 begins to conduct instantaneously without creating any interference and the amplifier-inverter 20 is then fed with the "sinusoidal arcs" generated in this case by the amplifier 32 itself supplied with accumulated electrical energy from the capacitor $C_1$. This arrangement is sufficient to withstand short-term interruptions on the AC mains supply but it is obvious that the power supply circuit 11 can only be protected for a longer period if the DC voltage supply 12 is connected and the accumulator 13 is substituted for the capacitor $C_1$ as a result of the switch K operating. During operation from the back-up supply the overall efficiency is reduced since the auxiliary amplifier 32 operates under conditions analogous to those shown in FIG. 4a, but this reduction in efficiency applies during only a minor proportion of the overall operating time. To avoid the need to overrate the amplifier 32, and in particular to make provision for lengthy operation from the back-up supply, it is possible to "distribute" the additional dissipation between the auxiliary amplifier 32 and the amplifier-inverter 20. It is sufficient to provide at the input of the auxiliary amplifier 32 a device to increase the amplitude of the control signal and so to increase the amplitude of the "sinusoidal arcs" delivered to the output 33. This device will be associated, for example, with switching means, possibly subject to a time-delay, so as to come into service in the event of a long-term failure of the AC mains supply. The losses incurred in the amplifier 32 are then reduced whereas those incurred in the amplifier 20 are slightly increased.

Figure 3:
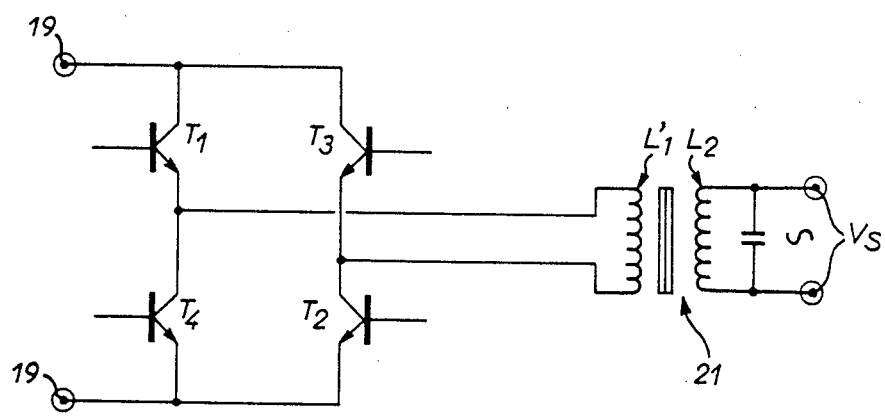
FIG. 3 is an alternative version of FIG. 2.

FIG. 3 shows an alternative embodiment of the power amplifier stage of the amplifier-inverter 20. This amplifier stage is still biased to operate in class B but in this instance comprises a bridged circuit of four transistors $T_1$, $T_2$, $T_3$, $T_4$ with the primary winding $L'_1$ of the output transformer connected across a diagonal of the bridge. A circuit of this kind makes it possible to operate from a high-tension rectifier connected directly to the AC mains supply, that is to say to dispense with the isolating transformer 16 of FIG. 1. It may then be necessary to use a high-tension (approximately 320 V) battery to supply the auxiliary amplifier. It is possible to operate from a low-tension (48 V) battery if use is made of two switchable primary windings defining different transformer ratios of the output transformer 21. Finally, it should be noticed that this type of circuit makes it possible to dispense with the output transformer, subject to a few modifications to the bridge circuit control circuit that are within the competence of those skilled in the art.

Transposition of this circuit to a three-phase system does not raise any difficulty. It is sufficient to triplicate the circuit with master oscillators appropriately phase-shifted relative to each other.

Finally, as previously mentioned, it is possible to bias the power amplifier stage of the amplifier-inverter 20 so that it operates in class C if there is no requirement to regulate the output voltage $V_S$. The efficiency is then improved by operating from the AC mains supply and it is still possible to add the means as described hereinabove to guard against failure of the AC mains supply.

The system that has just been described has numerous advantages. The main advantages are its excellent efficiency and the absence of radiated or conducted interference, as a result of linear operation excluding all high-frequency switching mode operation. The service life of transistors operating in class B in linear circuits is very much greater than that of the solid-state switching devices usually employed in this type of circuit. Apart from the possibility of dispensing with certain of the transformers described above (or even all of them), the circuit in accordance with the invention is rendered even more compact by the fact that the rectified voltage is not filtered by any bulky electrolytic capacitors. Reliability is further improved as a result of this. The ability to operate without any electrochemical accumulator (so that only short-term interruptions are compensated for) confers on the circuit in accordance with the invention all the advantages of a ferro-resonant regulator without any of its disadvantages. In particular, the dynamic response of the system is excellent because of the linear operation of the amplifier and amplifier-inverter circuits. The circuit can be made to withstand very high momentary overloads by increasing the number of transistors connected in parallel in the power stages and/or by inserting a time-delay into the response time of the amplifier current limiter circuits. The output voltage does not vary with fluctuations in the AC mains supply frequency and, subject to just a few minor modifications, the same device may be adapted to operate from an AC mains supply of any frequency, in particular 50 Hz, 60 Hz or 400 Hz. Finally, because there is no capacitive filtering of the rectified voltage the form factor of the current is substantially the same as that imposed by the user.

In other words, the device of the invention does not introduce any cos $\phi$ between the AC mains supply and the load circuit.

Figure 5:
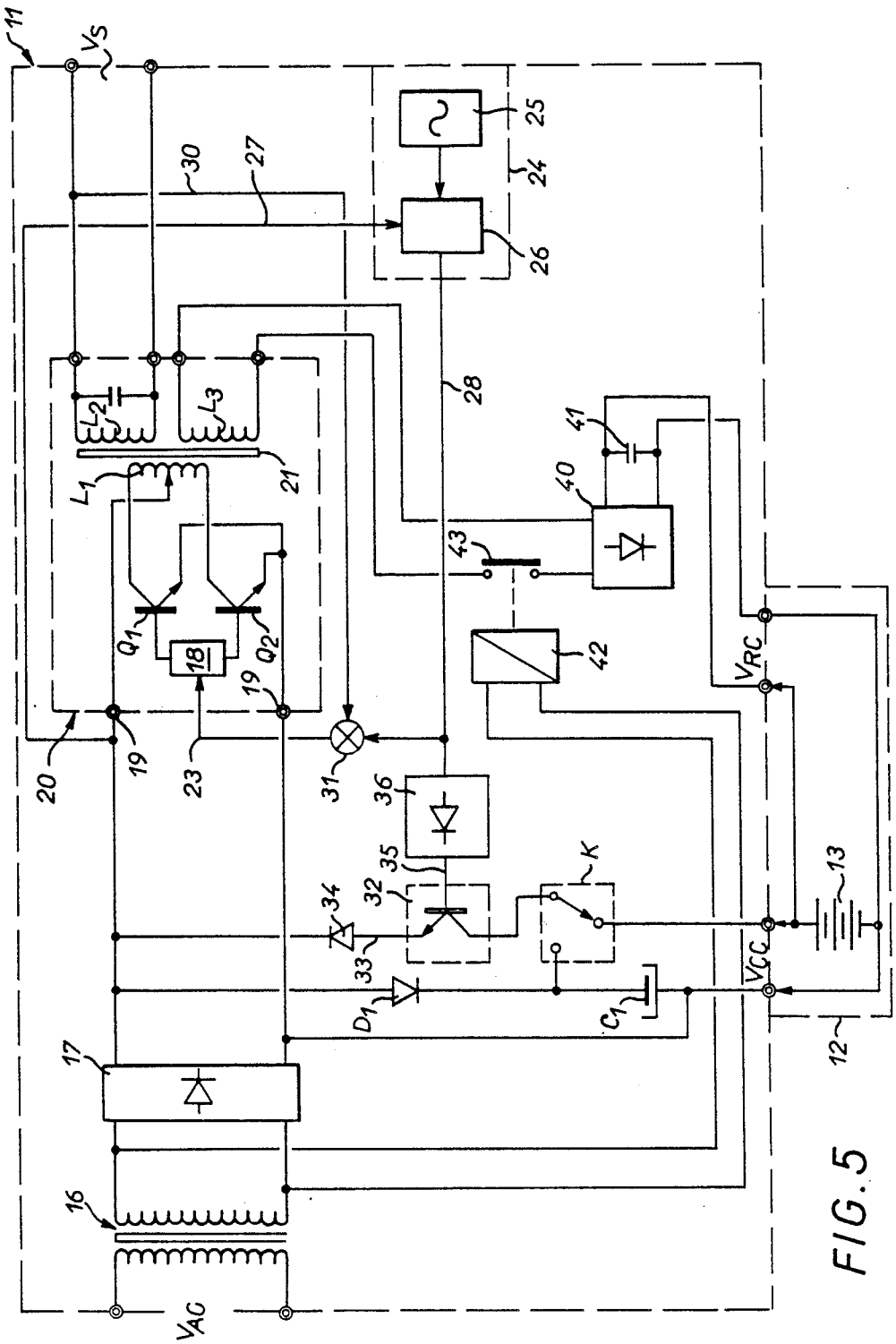
FIG. 5 shows an alternative embodiment of an alternating current electrical power supply circuit in accordance with the invention.

In the FIG. 5 embodiment components analogous to those of FIG. 1 carry the same reference numbers. This embodiment is particulary noteworthy for its electrochemical accumulator charging circuit and is therefore particularly beneficial when the device is associated with a DC voltage supply 12 that can be connected to its terminals $V_{CC}$ to offer increased protection time. The DC voltage supply 12 in this instance comprises an electrochemical accumulator 13 the terminals of which can be connected to the terminals $V_{CC}$ and to terminals $V_{RC}$ constituting the output of a charging circuit integrated into the circuit 11 and which will be described in more detail later. In its essentials the circuit 11 is identical to that in FIG. 1 except that the transformer 21 includes an auxiliary secondary winding $L_3$. Thus the previously mentioned feedback means also serve to regulate the voltage available at the terminals of this winding $L_3$. Furthermore, the circuit includes a rectifier circuit 40 connected to an AC voltage output of the amplifier-inverter 20, to be more specific the terminals of the winding $L_3$ in this case. The rectifier circuit constitutes most of the charging means for the electrochemical accumulator 13. Its rectified output voltage is filtered by a capacitor 41 and applied to the terminals $V_{RC}$. The charging current is fully regulated because the voltage delivered by the winding $L_3$ is highly stable since it is beneficially affected by all the regulation circuits provided to stabilize the voltage $V_S$. Switching means comprise a control circuit 42 connected to be responsive to the presence of a voltage delivered by the AC mains supply or a voltage dependent on the AC mains supply voltage. The switching means are connected at a point situated between the amplifier-inverter and the terminals $V_{RC}$ so as to interrupt charging of the accumulator when the AC mains supply voltage drops below a predetermined threshold. In the non-limiting example currently being described, the switching means consist in an electromagnetic relay or the like of which a contact 43 is inserted in series into the connection between the winding $L_3$ and the rectifier 40. Thus the previously mentioned control circuit 42 is simply the control winding of this relay, energized by the AC mains supply. This arrangement makes it possible to interrupt the charging of the accumulator 13 when this has to supply power to the amplifier-inverter 20 via the amplifier 32 on failure of the AC mains supply.

Thus it can be seen that the device 11 which has just been described serves to "condition" the AC mains supply, being responsible for stabilizing the voltage from this supply and being provided with at least part of the means to charge the accumulator 13. To this end it suffices to provide at least an auxiliary winding such as the winding $L_3$ as the other components of the charging circuit can be accommodated within the device 11 or within the DC voltage supply 12.

I claim:

1. Alternating current electrical power supply circuit comprising a rectifier adapted to be connected to an AC mains supply and to produce a rectified output voltage including ripple, an amplifier-inverter having power supply terminals connected to the output of said rectifier and a control input, and means for generating a voltage including ripple synchronous and in phase with the voltage of said AC mains supply connected to said control input of said amplifier-inverter.

2. Alternating current electrical power supply circuit according to claim 1, further comprising feedback means incorporated in or associated with said amplifier-inverter and adapted to stabilize its output voltage in the vicinity of a predetermined value.

3. Alternating current electrical power supply circuit according to claim 1, further comprising an auxiliary amplifier having a control input connected to means for generating a voltage including ripple synchronous and in phase with the voltage of said AC mains supply, energy storage means to which said auxiliary amplifier is connected, and means whereby said auxiliary amplifier has its output connected to said power supply terminals of said amplifier-inverter.

4. Alternating current electrical power supply circuit according to claim 3, wherein said means for generating a voltage including ripple synchronous and in phase with the voltage of said AC mains supply to which said control input of said auxiliary amplifier is connected and said means for generating a voltage including ripple synchronous and in phase with the voltage of said AC mains supply to which said control input of said amplifier-inverter is connected are one and the same.

5. Alternating current electrical power supply circuit according to claim 4, wherein said means for generating a voltage including ripple synchronous and in phase with the voltage of said AC mains supply comprise a master oscillator adapted to produce a voltage including ripple similar to and at the same frequency as the voltage of said AC mains supply and a synchronization circuit connected to said rectifier.

6. Alternating current electrical power supply circuit according to claim 3, wherein said electrical energy storage means comprise at least one capacitor having a capacitance that is sufficiently large to feed electrical energy to said auxiliary amplifier during a short-term disconnection of said AC mains supply and further comprising a charging circuit for charging said at least one capacitor connected to said AC mains supply.

7. Alternating current electrical power supply circuit according to claim 3, wherein said electrical energy storage means comprise an electrochemical accumulator that has sufficient capacity to feed electrical energy to said auxiliary amplifier during a long-term disconnection of said AC mains supply.

8. Alternating current electrical power supply circuit according to claim 1, wherein said amplifier-inverter comprises a transistorized power amplifier stage operating in class B.

9. Alternating current electrical power supply circuit according to claim 8, wherein said amplifier-inverter includes a transformer connected to the output of said power amplifier stage.

10. Alternating current electrical power supply circuit according to claim 9, wherein said transformer has a center-tapped primary winding and said power amplifier stage is of the push-pull type.

11. Alternating current electrical power supply circuit according to claim 1, wherein said amplifier-inverter includes a bridged transistorized power amplifier stage operating in class B.

12. Alternating current electrical power supply circuit according to claim 1, wherein said amplifier-inverter includes a transistorized power amplifier stage operating in class C.

13. Alternating current electrical power supply circuit according to claim 3, further comprising means responsive to failure of said AC mains supply adapted to increase the amplitude of the control signal supplied to said auxiliary amplifier.

14. Alternating current electrical power supply circuit according to claim 7, further comprising a rectifier circuit forming at least part of means for charging an electrochemical accumulator and wherein said amplifier-inverter has an AC voltage output connected to said rectifier circuit.

15. Alternating current electrical power supply circuit according to claim 14, further comprising switching means and a control circuit for said switching means adapted to sense a voltage output by or conditioned by presence of an output from said AC mains supply, wherein said switching means are connected to a point located between said amplifier-inverter and the terminals of said electrochemical accumulator so as to interrupt charging of said accumulator when said voltage falls below a predetermined threshold.

16. Alternating current electrical power supply circuit according to claim 15, wherein said switching means comprise an actuator device having a control winding connected to said AC mains supply or to a voltage representative of the voltage of said AC mains supply and switch contacts inserted in series into the connection between said AC voltage output and said terminals.

17. Alternating current electrical power supply circuit according to claim 14, wherein said amplifier-inverter comprises a transistorized power amplifier stage operating in class B and a transformer connected to the output of said power amplifier stage, wherein said AC voltage output of said amplifier-inverter consists in the terminals of a winding of said transformer.

18. Alternating current electrical power supply circuit according to claim 3, wherein said means whereby said auxiliary amplifier has its output connected to said power supply terminals of said amplifier-inverter permit current to flow in one direction only.

19. Alternating current electrical power supply circuit according to claim 18, wherein said means whereby said auxiliary amplifier has its output connected to said power supply terminals of said amplifier-inverter comprise a diode.

20. Alternating current electrical power supply circuit according to claim 16, wherein said actuator device is an electromagnetic relay.

21. Alternating current electrical power supply circuit according to claim 4, wherein said means for generating a voltage including ripple synchronous and in phase with the voltage of said AC mains supply comprise a master oscillator adapted to produce a voltage including ripple similar to and at the same frequency as the voltage of said AC mains supply and a synchronization circuit connected to said AC mains supply.

* * * * *